United States Patent
Consonni et al.

(10) Patent No.: US 9,213,158 B2
(45) Date of Patent: Dec. 15, 2015

(54) OPTICAL CABLE FOR COMMUNICATION AND PROCESS FOR THE MANUFACTURING THEREOF

(75) Inventors: Enrico Consonni, Milan (IT); Davide Ceschiat, Milan (IT); Silvio Frigerio, Milan (IT); Flavio Tridello, Milan (IT)

(73) Assignee: Prysmian S.P.A., Milan (IT)

( * ) Notice: Subject to any disclaimer, the term of this patent is extended or adjusted under 35 U.S.C. 154(b) by 869 days.

(21) Appl. No.: 13/431,164

(22) Filed: Mar. 27, 2012

(65) Prior Publication Data

US 2012/0257864 A1    Oct. 11, 2012

Related U.S. Application Data

(63) Continuation-in-part of application No. PCT/EP2009/062491, filed on Sep. 28, 2009.

(51) Int. Cl.
*G02B 6/44* (2006.01)

(52) U.S. Cl.
CPC .............. *G02B 6/4429* (2013.01); *G02B 6/441* (2013.01); *G02B 6/4433* (2013.01); *G02B 6/4495* (2013.01)

(58) Field of Classification Search
None
See application file for complete search history.

(56) References Cited

U.S. PATENT DOCUMENTS

| | | | |
|---|---|---|---|
| 5,155,789 A | 10/1992 | Le Noane et al. | |
| 5,671,312 A | 9/1997 | Jamet | |
| 6,215,931 B1 | 4/2001 | Risch et al. | |
| 6,334,015 B2 | 12/2001 | Jamet | |
| 6,584,251 B1 | 6/2003 | Ardouin | |
| 6,658,184 B2 | 12/2003 | Bourget et al. | |
| 6,937,802 B2 | 8/2005 | Jamet et al. | |
| 6,973,246 B2 | 12/2005 | Bocanegra et al. | |
| 7,082,241 B2 | 7/2006 | Jamet et al. | |
| 7,136,556 B2 | 11/2006 | Brown et al. | |
| 7,536,071 B2 | 5/2009 | Pavan et al. | |
| 2002/0001440 A1 | 1/2002 | Bourget et al. | |
| 2005/0063650 A1* | 3/2005 | Castellani et al. | 385/100 |
| 2006/0147164 A1 | 7/2006 | Bau et al. | |
| 2008/0212927 A1 | 9/2008 | Pavan et al. | |
| 2008/0267569 A1* | 10/2008 | Ginocchio et al. | 385/109 |
| 2008/0304797 A1* | 12/2008 | Castellani et al. | 385/100 |

(Continued)

FOREIGN PATENT DOCUMENTS

| | | |
|---|---|---|
| EP | 1160606 A2 | 12/2001 |
| EP | 1591814 A1 | 11/2005 |

(Continued)

OTHER PUBLICATIONS

International Search Report in counterpart International Application No. PCT/EP2009/062491 dated Apr. 6, 2010, pp. 1-3.

(Continued)

*Primary Examiner* — Hemang Sanghavi
(74) *Attorney, Agent, or Firm* — Additon, Higgins & Pendleton, P.A.

(57) ABSTRACT

It is disclosed an optical cable for communications including at least one micromodule, the micromodule including a retaining element and number N of optical fibers housed in said retaining element. The diameter of a circumference encircling the number N of optical fibers is typically 90% to 95% of an inner diameter of the retaining element. The retaining element consists essentially of a film grade polymeric material having an elongation at break equal to or higher than 500%, a melt flow index (MFI) lower than 3 g/10 min, and a density lower than 1 g/cm$^3$.

22 Claims, 4 Drawing Sheets

(56) References Cited

U.S. PATENT DOCUMENTS

2008/0304798 A1* 12/2008 Pavan et al. .................. 385/110
2010/0322574 A1* 12/2010 Merbach et al. ............. 385/112

FOREIGN PATENT DOCUMENTS

| EP | 1821124 A1 | 8/2007 |
| WO | 01/21706 A1 | 3/2001 |
| WO | 2006/034722 A1 | 4/2006 |
| WO | 2011/035814 A1 | 3/2011 |

OTHER PUBLICATIONS

INEOS Polyolefins Product Data Sheet for BPD 3220, downloaded from www.vipa.it/pdf/BPD3220.pdf, Sep. 2007, pp. 1-3.
SIPOL, Sipolprene Technical Data Sheet, downloaded from www.sipol.it/eng/prod/s pren.html, May 23, 2012, pp. 1-2.
IDES, Casico FR4805 Product Data Sheet, downloaded from www.ides.com/info/datasheet/E74795/Casico-FR4805, May 23, 2012, pp. 1-4.

\* cited by examiner

OPTICAL CABLE FOR COMMUNICATION AND PROCESS FOR THE MANUFACTURING THEREOF

CROSS-REFERENCE TO PRIORITY APPLICATION

This application is a continuation-in-part of International Application No. PCT/EP2009/062491 for an Optical Communication Cable and Manufacturing Process (filed Sep. 28, 2009, and published Mar. 31, 2011, as Publication No. WO 2011/035814 A1), which is hereby incorporated by reference in its entirety.

FIELD OF THE INVENTION

The present invention relates to the field of optical cables for communications and to the process for the manufacturing thereof. In particular, the present invention relates (i) to an optical cable for communications including at least one micromodule, (ii) to a micromodule for such an optical cable, and (iii) to the manufacturing thereof.

BACKGROUND

An optical cable for communications typically includes a number of optical fibers. The optical fibers housed in an optical cable may be arranged in one or more bundles, each bundle of optical fibers being housed in a respective retaining element. The bundle of optical fibers with the respective retaining element is typically termed "micromodule."

A micromodule typically includes 2 to 12 optical fibers arranged substantially parallel to the axis of the micromodule or according to an open helix pattern (generally termed "S-Z") about the axis of the micromodule. The retaining element is generally made of a polymeric material, in particular a thermoplastic material optionally charged with mineral fillers. The space between the optical fibers within the retaining element may be empty, or it may be filled with jelly, talc, or water-swellable yarns for preventing propagation of water within the micromodule.

The one or more micromodules form the so-called "optical core" of the optical cable. The optical core is generally inserted into a protective sheath that is also made of a polymeric material. The protective sheath typically has a number of elongated reinforcing elements arranged in the thickness thereof and parallel to the axis of the optical cable.

U.S. Pat. No. 5,155,789, which is hereby incorporated by reference in its entirety, discloses a telecommunications cable comprising a series of optical fibers split into modules, each of which is enveloped by a thin supporting sheath, the sheaths being in contact with the optical fibers. The supporting sheath is made of a plastic, such as polyethylene, polypropylene, or polyamides. The supporting sheath is constituted by a layer of thickness lying in the range a few thousandths of a millimeter to a few tenths of a millimeter and preferably lying in the range one hundredth of a millimeter to one tenth of a millimeter. The supporting sheath material may extend between the fibers to obtain a more intimate contact, and indeed the optical fibers may be completely embedded in the material constituting the supporting sheath.

U.S. Pat. No. 5,671,312, which is hereby incorporated by reference in its entirety, discloses a cable comprising a series of optical fibers, each of which is covered in a primary sheath. The optical fibers are collected together in modules that may contain some variable number of optical fibers. Each module is itself wrapped in a thin supporting sheath that is easily tearable and that is intended to keep the optical fibers in contact with one another so as to provide mechanical coupling between them.

U.S. Pat. No. 6,334,015, which is hereby incorporated by reference in its entirety, discloses a telecommunication cable including a plurality of optical fibers. A thin and generally cylindrical retaining sheath envelops the optical fibers. The retaining sheath tightly grips a predetermined number N of optical fibers to hold the optical fibers in a group and thereby constitute a compact module. The retaining sheath is extruded into a thermoplastics material. The material of the retaining sheath has a thickness less than 0.3 mm, preferably in the range from 0.1 to 0.2 mm. For example, the material of the retaining sheath is an amorphous thermoplastics material for example polyvinylchloride (PVC) or an elastomer; or a charged thermoplastics material, for example polyethylene or a polyolefin such as ethylene vinyl acetate (EVA), containing a sufficient quantity of one or more mineral charges.

U.S. Pat. No. 6,937,802, which is hereby incorporated by reference in its entirety, discloses a telecommunication cable including a plurality of modules, each with a thin retaining sheath for clamping optical fibers together. Each retaining sheath contains plural respective modules and is mechanically coupled to the retaining sheaths of the respective modules to form super-modules that contact an outside jacket. The thickness of the sheath is at most about a few tenths of a millimeter, typically from 0.1 mm to 0.5 mm.

The above listed documents teach optical fibers contained in modules having a thin sheath. The modules houses the optical fibers as tightly as possible to ensure the coupling (or clamping) thereof.

International Publication No. WO 01/21706, which is hereby incorporated by reference in its entirety, discloses a material for forming thin films, in particular for the outer sheath of a micromodule for an optical cable. The material includes a composition containing an olefin polymer and a filler amount ranging between 25 and 65 weight percent (wt %) of the composition, said material in an undivided state having a tensile strength ranging between 6 and 20 MPa and an elongation at break ranging between 50% and 300%.

U.S. Pat. No. 7,082,241, which is hereby incorporated by reference in its entirety, discloses a telecommunication cable of the microcable or minicable type having optical fibers contained in a thin retaining sheath. The retaining sheath clamps the optical fibers to hold the optical fibers in groups. The retaining sheath is in contact with and mechanically coupled to the optical fibers. The coupling between the optical fibers and the retaining sheath referred to above is defined as a mechanical coupling between two members, meaning that any stress applied to one of the members is transferred to the other member or that if one of the members is stressed the other is also stressed, without this necessitating any bonding or other fixing of one of the members to the other. The retaining sheath has a thickness of the order of a few tenths of a millimeter, typically 0.25 mm. The material of the retaining sheath is an amorphous thermoplastic material, an elastomer, or a thermoplastic material that can contain mineral charges.

U.S. Pat. No. 6,658,184, which is hereby incorporated by reference in its entirety, discloses a telecommunications cable module comprising a plurality of optical fibers. The optical fibers are surrounded by a flexible tube referred to as a "skin." The thickness of the skin lays in the range 0.05 mm to 0.25 mm, and is preferably 0.15 mm. The skin is of a thermoplastic elastomer having flexible diol segments, with a melting point greater than 130° C. and initial tearing strength. The material disclosed preferably presents breaking elongation lying in the range 50% to 300% and tensile strength lying in the range 5

MPa to 15 MPa. The material has hardness on the Shore D scale of less than 50. The elastomer properties are provided by flexible segments in the polymer chain (copolymers with polyether segments).

U.S. Pat. No. 6,215,931, which is hereby incorporated by reference in its entirety, discloses a bundle of optical fibers surrounded by a buffer tube in near-tight configuration. The buffer tube is made from a thermoplastic polyolefin elastomer having a room temperature modulus of elasticity below about 500 MPa and a low temperature (−40° C.) modulus of elasticity below about 1500 MPa. The buffer material has a Melt Flow Index above about 3. The thermoplastic polyolefin elastomer material used to form the buffer tube may also contain organic or inorganic fillers. The thermoplastic polyolefin elastomer material forming the buffer tube has an elongation at break <500% at room temperature. If the modulus of elasticity and elongation at break are low enough, the buffer tube can be easily removed without special tools and without damaging the optical fiber or fibers disposed therein.

International Publication No. WO 2006/034722 (and its counterpart U.S. Pat. No. 7,536,071), which are hereby incorporated by reference in their entirety, disclose a micromodule comprising a plurality of optical fibers and a retaining element for containing the optical fibers. The retaining element of the micromodule is made of a thermoplastic polymeric composition having an elastic module lower than 500 MPa at 20° C., an ultimate tensile strength comprised between 5 and 10 MPa, and an elongation at break comprised between 30% and 80%. The retaining element has a thickness that is preferably between 0.1 and 0.2 mm. In the case of a micromodule containing 12 optical fibers, the micromodule has an overall size having a maximum transversal dimension comprised between 1.25 mm and 1.45 mm.

SUMMARY

Increasing the packing density of micromodules within an optical cable sheath may be achieved by reducing the external diameter of the micromodules. Such increased packing density is useful in so-called FTTx (Fiber-To-The-x) market, which denotes the portion of the optical communication network that reaches the premises (e.g., homes, offices, and the like) of the end user. In such networks, the conduits for the passage of the micromodules can be narrow if located in old buildings and/or if already partially hindered (e.g., by other cables, such as electrical cables).

Preferably, a micromodule containing 12 optical fibers and having an external diameter equal to or lower than 1.30 mm was sought.

When facing the problem of reducing the micromodule size, especially the diameter thereof, it is thought that the wall thickness of the retaining element might be reduced, but such a reduction should take into account some aspects:

the extrudability of the material into thin layer; and the tearability of the material for exposing and splicing the optical fibers contained in the retaining element.

These two aspects are contradictory in that, while the extrudability into thin layer requires materials with a significant elongation at break, an easy tearability—advantageously attainable by hand—implies low elongation at break.

A decrease in the elongation at break value of a polymeric material to improve the tearability thereof can be obtained by adding inorganic filler to the mixture, but such addition generally impairs the extrudability into thin film.

It was observed that materials commonly used for the manufacturing of retaining elements could not be extruded in very thin film layers (e.g., with a thickness equal to or lower than 0.130 mm) and, more specifically, could not be extruded by a process industrially affordable and replicable. In view of the low thickness, retaining elements made of such material often break during extrusion.

Film grade materials were tested for manufacturing retaining elements by extrusion about optical fibers. In the following description and in the claims, the term "film grade material" refers to a polymeric material that is adapted to be extruded in a thin film, typically of 0.01-0.05 mm, without defects or tearing in the extruded product. Such polymeric materials are characterized by a number of chemical features (e.g., a branched structure, amount of crystallinity) and/or physical features (e.g., density and tearability). The elongation at break of this kind of material is typically higher than that of materials traditionally used for fabricating retaining element (i.e., it may be higher than 500%, such as about 700% or 800%).

Retaining elements with reduced thickness (e.g., in the range 0.077 mm to 0.130 mm) for containing 12 optical fibers) were extruded in substantially tight contact with the optical fibers using a film grade material. No breakage of the retaining element occurred during extrusion.

It was found that in spite of the high elongation at break of the material from which the retaining element was extruded, the tearability of the retaining element off the optical fibers was acceptable.

Regrettably, it was observed that the optical fibers housed in the micromodules, produced as described above, showed unacceptable bending losses. In particular, it was observed that when optical cables including micromodules, produced as described above, are subjected to bending (e.g., due to the winding on bobbin), adhesion of the optical fibers to the retaining element is not uniform along the cable, thus inducing irregular bending of the micromodule.

It was perceived that acceptable bending losses might be obtained if the optical fibers were not in tight contact with the retaining element of the micromodule. In particular, it was found that acceptable bending losses are obtained when the diameter of the circumference circumscribing the optical fibers is in a predetermined percentage range of the internal diameter of the retaining element. The optical fibers can be positioned within the retaining element with a clearance between the optical fibers and the surrounding retaining element.

However, for preserving the above mentioned external diameter (i.e., equal to or lower than 1.30 mm, for example of 1.15 mm for a 12 optical fiber micromodule) while housing the optical fibers loosely enough to obtain the desired bending losses, a further reduction of the thickness of the retaining element is desirable.

A further reduction in the retaining element thickness could give rise to problem of extrudability even using film grade material. In addition, a thin retaining element was believed to be unsuitable to provide the optical fibers housed therein with an adequate mechanical protection, especially when the micromodule is wound on spools or the like.

It was found that a micromodule having a retaining element extruded using a film grade material with such a low thickness can be obtained by selecting properly the film grade material. Surprisingly, it has been found that the loose housing of the fibers inside such a thin retaining element was effective to separate the fibers from the mechanical stress, thereby providing suitable mechanical protection.

Furthermore, it was found that such a retaining element, in spite of its high elongation at break, shows an improved tearability and may be easily removed from the optical fibers without using any special tool.

Amongst possible film grade materials characterized by different chemical and physical features, film grade polymer materials useful for the present invention were identified as those polymers typically characterized by an elongation at break equal to or higher than 500% (e.g., 600%-800%), a melt flow index (MFI) lower than 3 g/10 min, and a density lower than 1 g/cm$^3$.

In the present description and claims the term "elongation at break" means elongation at break measured according to the test method IEC 811-1-1; the term "melt flow index" means the melt flow index measured according to the test method ISO1133; and the term "density" means density measured according to the test method ISO1183-D.

According to a first aspect, the present invention provides an optical cable for communications including at least one micromodule, the micromodule including a retaining element and number N of optical fibers housed in the retaining element, wherein:

the diameter of the circumference encircling the number N of optical fibers is 90% to 95% of an inner diameter of the retaining element; and the retaining element is made essentially of a film grade polymeric material having an elongation at break equal to or higher than 500%, a melt flow index (MFI) lower than 3 g/10 min, and a density lower than 1 g/cm$^3$. The film grade polymeric material is made mostly of high-grade polymers, but can include additives (e.g., to provide enhanced performance and/or to ease the manufacturing process).

Preferably, the film grade polymeric material is uncharged. In the present description and claims, the term "uncharged polymeric material" refers to a polymer base containing an amount of at least one inorganic component from 0 to 2 wt %.

Preferably, the retaining element has a thickness ranging from 0.030 mm to 0.125 mm, more preferably from 0.050 mm to 0.110 mm.

Preferably, the retaining element is made of a polymeric material having an elongation at break equal to or higher than 600% (e.g., 700-800%).

According to a preferred embodiment, the number N of optical fibers is equal to 12, and the outer diameter of the retaining element ranges from 1.15 mm and 1.3 mm.

According to another preferred embodiment, the number N of optical fibers is equal to 4, and the outer diameter of the retaining element ranges from 0.75 mm to 0.89 mm.

According to a second aspect, the present invention provides a micromodule for an optical cable for communications including a retaining element and a number N of optical fibers housed in the retaining element, wherein:

a diameter of a circumference encircling the number N of optical fibers is 90% to 95% of an inner diameter of the retaining element; and the retaining element is made essentially of a film grade material having an elongation at break equal to or higher than 500%, a melt flow index (MFI) lower than 3 g/10 min, and a density lower than 1 g/cm$^3$. As noted, the film grade polymeric material is made mostly of high-grade polymers, but can include additives (e.g., to provide enhanced performance and/or to ease the manufacturing process).

Preferably, the retaining element has a thickness ranging from 0.030 mm to 0.125 mm, more preferably from 0.050 mm to 0.110 mm.

Preferably, the retaining element is made of a polymeric material having an elongation at break equal to or higher than 600% (e.g., 650-800%).

Preferably, the film grade polymeric material is uncharged.

According to a preferred embodiment, the number N of optical fibers is equal to 12, and the outer diameter of the retaining element ranges from 1.15 mm and 1.3 mm.

According to another preferred embodiment, the number N of optical fibers is equal to 4, and the outer diameter of the retaining element ranges from 0.75 mm to 0.89 mm.

According to a third aspect, the present invention provides use of a polymeric material having an elongation at break equal to or higher than 500%, a melt flow index (MFI) lower than 3 g/10 min, and a density lower than 1 g/cm$^3$ for manufacturing a retaining element for a micromodule of an optical cable for communications.

According to a fourth aspect, the present invention provides a process for manufacturing a micromodule for an optical cable for communications, the process including:

providing a number N of optical fibers; and providing a retaining element around the number N of optical fibers thus forming the micromodule, wherein providing a retaining element includes extruding a film grade material, the film grade material having an elongation at break equal to or higher than 500%, a melt flow index MFI lower than 3 g/10 min, and a density lower than 1 g/cm$^3$, wherein the diameter of a circumference encircling the number N of optical fibers is 90% to 95% of the inner diameter of the retaining element.

Preferably, the step of extruding is performed via extrusion assemblies including a tip element and a die element.

Preferably, the tip element and the die element have a draw down ratio DDR ranging from 4.5 to 8.5.

Preferably, the step of extruding is performed at a line rate ranging from 40 m/min to 150 m/min.

Advantageously, the extruding step is typically performed by tubing extrusion.

The term "tubing extrusion" refers to an extrusion process where tip and die are aligned so that the extruded material exits therefrom with a defined crown cross section value that, by stretching, reaches a final crown cross section value (internal and external diameters). The value of the final crown cross-section depends on the extrusion flow and the line speed.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
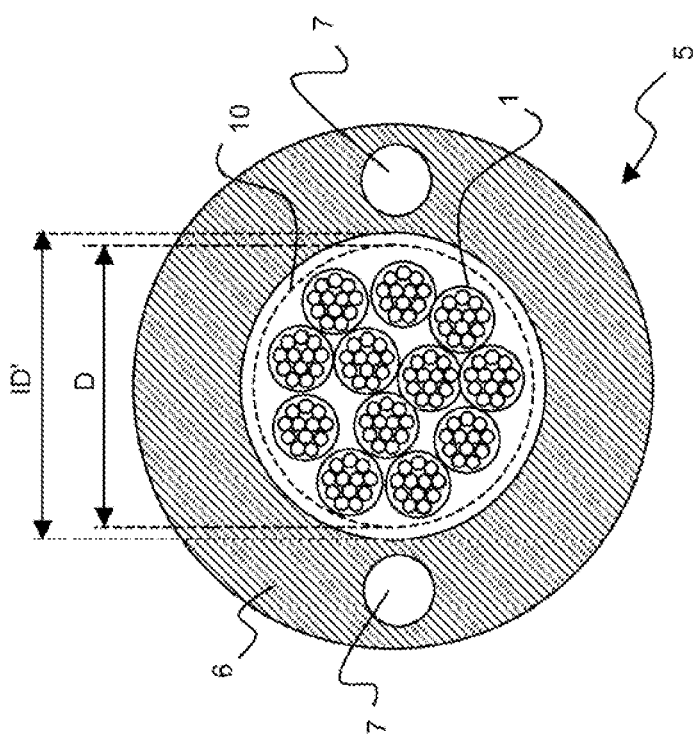
FIG. 1 is a cross-section view of an optical cable including a number of micromodules.

FIG. 1 shows an optical cable 5 according to an embodiment of the present invention.

The optical cable 5 includes a number of micromodules 1 forming an optical core 10 and an outer sheath 6. Two opposite reinforcing longitudinal elements 7 are preferably arranged in the thickness of the outer sheath 6. The micromodules 1 are preferably stranded according to a helix of the "SZ" type within the interior of the outer sheath 6. The optical cable 5 depicted in FIG. 1 includes 12 micromodules 1. However, the optical cable 5 may include any number of micromodules 1. For instance, an optical cable 5 may include 24, 36, or 60 micromodules 1, each including 12 optical fibers 2.

In case the optical cable 5 includes 60 micromodules 1 (not all shown in FIG. 1), the diameter of the optical core 10 (indicated as D in FIG. 1) is preferably of about 10.3 mm. Besides, preferably, the diameter D of the optical core 10 is no more than 90% of the inner diameter of the outer sheath 6 (indicated as ID' in FIG. 1). If the diameter D of the optical core 10 is equal to 90% of the inner diameter ID' of the outer sheath 6, the inner diameter ID' of the outer sheath 6 is substantially equal to 11.5 mm. The diameter of each reinforcing longitudinal element is preferably equal to 1.2 mm, and the thickness of the outer sheath 6 is preferably equal to 2.2 mm. The overall diameter of the optical cable 5 is accordingly substantially equal to 16 mm.

Figure 2:
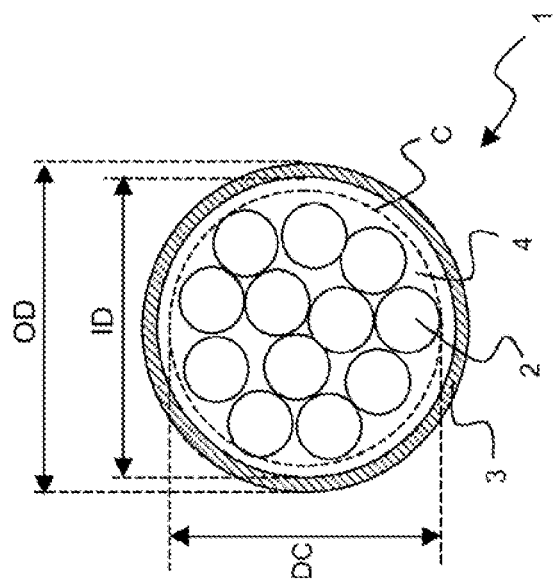
FIG. 2 is a cross-section view of a micromodule according to a preferred embodiment of the present invention.

With reference to FIG. 2, each micromodule 1 includes a number N of optical fibers 2 and a retaining element 3 for containing the optical fibers 2. The retaining element 3 is arranged in a radially outer position with respect to the N optical fibers 2. The N optical fibers 2 are preferably stranded according to a helix of the "SZ" type within the interior of retaining element 3. Each optical fiber 2 typically has an outer diameter of about 0.25 mm (e.g., 242 microns). By way of non-limiting example, the micromodule 1 shown in FIG. 2 includes N=12 optical fibers 2.

The space between the optical fibers 2 within the retaining element 3 may be empty, or it may be filled with jelly, talc, or water-swellable yarns for preventing propagation of water within the micromodule 1. In this regard, it may be suitable to provide a micromodule that is substantially free of thixotropic compositions, such as jelly.

FIG. 2 shows a circle C enclosing the N optical fibers 2. The diameter (indicated as DC in FIG. 2) of the circle C depends on the number N of optical fibers 2 included in the micromodule 1 and on a parameter K, indicative of the pattern according to which the optical fibers 2 are arranged within the micromodule 1. Preferably, the diameter DC of the circle C is of from 90% to 95% of the inner diameter of the retaining element 3 (indicated as ID in FIG. 2). Preferably, the outer diameter of the retaining element 3 (indicated as OD in FIG. 2) is of from 1.15 mm to 1.30 mm. The thickness of the retaining element 3 is preferably from 0.030 mm to 0.125 mm, more preferably from 0.050 mm to 0.110 mm.

Table I (below) shows values of the diameter DC of the circle C, the inner diameter ID, and the outer diameter OD relative to embodiments of the micromodule 1 according to the invention, including different numbers N of optical fibers 2, assuming that the thickness of the retaining element 3 is 0.050 mm.

TABLE I

| N | K | diameter of C (mm) | DC/ID (%) | ID (mm) | OD (mm) |
|---|---|---|---|---|---|
| 4 | 2.410 | 0.603 | 92.69 | 0.65 | 0.75 |
| 6 | 2.900 | 0.725 | 96.67 | 0.75 | 0.85 |
| 8 | 3.300 | 0.825 | 91.67 | 0.90 | 1.00 |
| 10 | 3.637 | 0.909 | 95.70 | 0.95 | 1.05 |
| 12 | 3.984 | 0.996 | 94.85 | 1.05 | 1.15 |

Table II (below) shows the values of the diameter DC of the circle C, the inner diameter ID, and the outer diameter OD relative to five different embodiments of the micromodule 1, including five different numbers N of optical fibers 2, assuming that the thickness of the retaining element 3 is 0.125 mm.

TABLE II

| N | K | diameter of C (mm) | DC/ID (%) | ID (mm) | OD (mm) |
|---|---|---|---|---|---|
| 4 | 2.410 | 0.603 | 94.14 | 0.64 | 0.89 |
| 6 | 2.900 | 0.725 | 95.39 | 0.76 | 1.01 |
| 8 | 3.300 | 0.825 | 94.83 | 0.87 | 1.12 |
| 10 | 3.637 | 0.909 | 94.70 | 0.96 | 1.21 |
| 12 | 3.984 | 0.996 | 94.85 | 1.05 | 1.30 |

Tables 1-2 (above) show that, in case the micromodule 1 includes N=12 optical fibers 2, the external diameter OD of the retaining element 3 (and therefore of the whole micromodule 1) lies in the sought range 1.15 mm to 1.30 mm. In case the number of optical fibers per micromodule decreases, even lower values of the external diameter OD may be obtained. For instance, a micromodule with 4 optical fibers advantageously has an external diameter OD lying in the range 0.75 mm to 0.89 mm. This advantageously allows obtaining very compact micromodules and accordingly optical cables with increased optical fiber density.

The retaining element 3 is preferably made solely (e.g., homogeneously formed) of a film grade material having an elongation at break equal to or higher than 500%, preferably equal to or higher than 600%, more preferably equal to or higher than 800%, a melt flow index (MFI) lower than 3 g/10 min (e.g., between about 2.2 and 2.8 g/10 min), and a density lower than 1 g/cm$^3$. In this regard and as noted, the film grade polymeric material can include additives provided the resulting polymeric material satisfies the foregoing properties (i.e., elongation at break, MFI, and density).

The film grade material is preferably an uncharged material. As "uncharged material" it is herein meant that the film grade material preferably includes at least one inorganic component in an amount from about 0 to 2 wt %.

In particular, Table III (below) provides extrusion tests for different polymer materials.

TABLE III

| Example | Elongation at break | Melt flow index (g/10 min) | Density (g/cm$^3$) |
|---|---|---|---|
| 1 | >800% | 2.4 | 0.920 |
| 2* (comparative) | 700% | 40 | 1.160 |
| 3* (comparative) | 600% | 0.4 | 1.160 |

Example 1 employed linear low density polyethylene BPD3220 produced by INEOS O&P Europe (Lyndhurst, Hampshire, UK).

Comparative Example 2* employed an elastomer polymer containing rigid polyester blocks and flexible polyether or polyester blocks produced under the name Sipolprene 46185 by SIPOL S.p.A. (Mortara, Italy).

Comparative Example 3* employed a thermoplastic compound containing inorganic filler produced under the name Casico™ FR4805 by Borealis A/S (Kongens Lyngby, Denmark).

Micromodules having an internal diameter of 1.05 mm and an external diameter of 1.15 mm were manufactured using the polymer material of Example 3*: Unacceptable tearing in the retaining elements was observed.

Micromodules having the same size as above were manufactured using the polymer material of Example 2*: The optical fibers contained in the retaining elements made with this material showed unacceptable attenuation both in substantially tight configuration and when the diameter of the circumference C was in accordance with the present invention.

Micromodules having the same size as above were manufactured using the polymer material of Example 1: the attenuation of the optical fibers contained in the retaining elements made with this material was within the prescribed limit; the retaining elements could be easily removed.

Figure 3A:
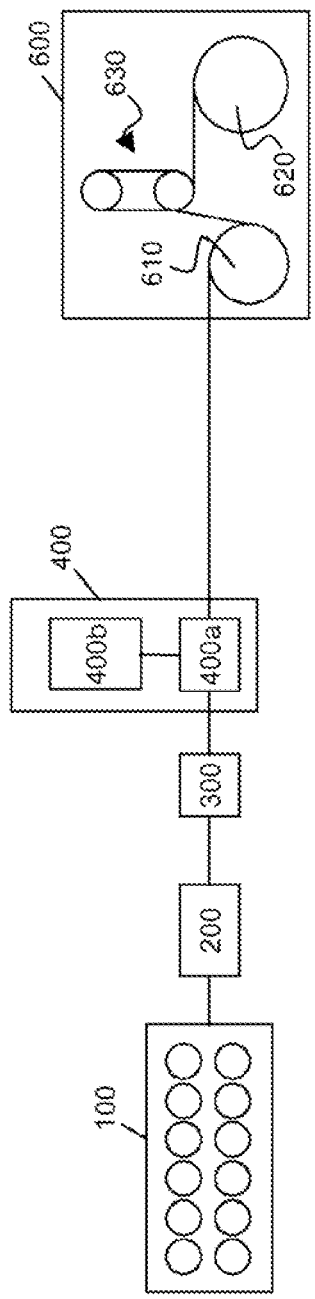
FIGS. 3a and 3b schematically show an apparatus for manufacturing the micromodule of FIG. 2, according to a first and second variant, respectively.
Figure 3B:
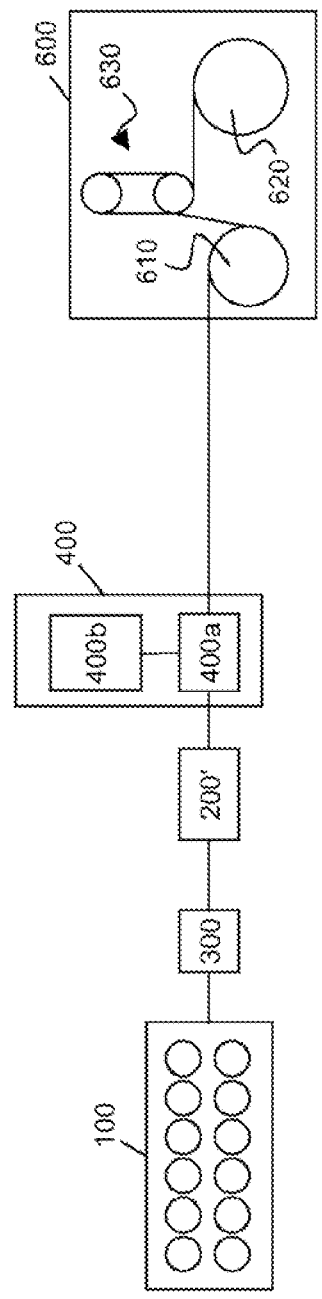

FIGS. 3a and 3b schematically show an apparatus for manufacturing the micromodule of FIG. 2 according to a first and second variant, respectively.

In particular, the apparatus of FIG. 3a includes a fiber unrolling stage 100, a talc injection stage 200, an S-Z winding stage 300, an extrusion stage 400, and a stretching and collecting stage 600.

The fiber unrolling stage 100 preferably includes N spools of optical fibers (schematically represented by circles in FIG. 3a), N being equal to the number of optical fibers included in a single micromodule.

The stretching and collecting stage 600 preferably includes a stretching drum 610 and a collecting drum 620 connected by one or more pulleys 630.

The extrusion stage 400 preferably includes a supply unit 400b and extrusion tooling assemblies 400a. The supply unit 400b preferably supplies the extrusion tooling assemblies 400a with the film grade material to be extruded for forming the retaining element 3.

Figure 4:
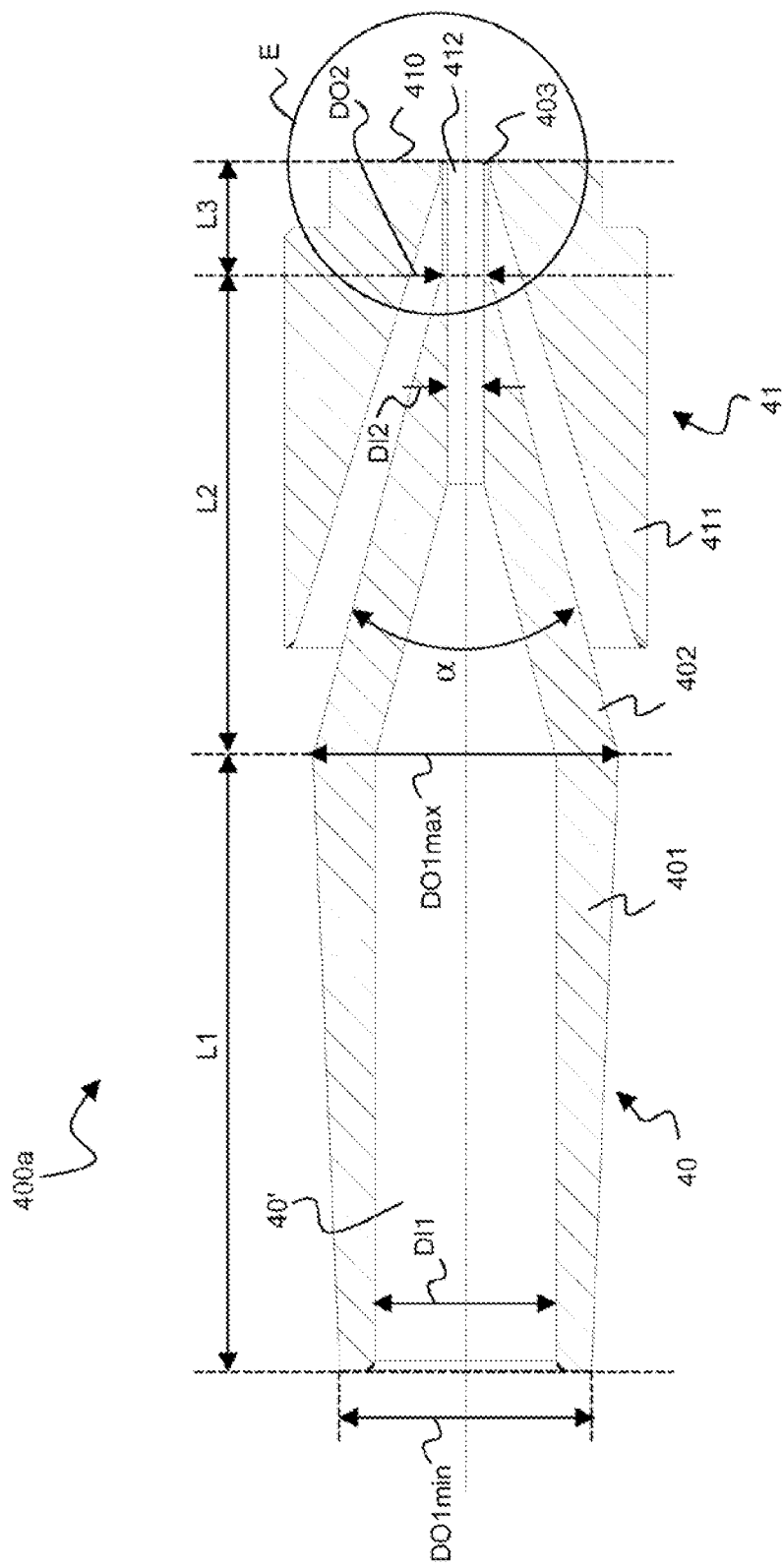
FIG. 4 is a sectional view of extrusion tooling assemblies suitable for extruding the retaining element of the micromodule of FIG. 2.
Figure 5:
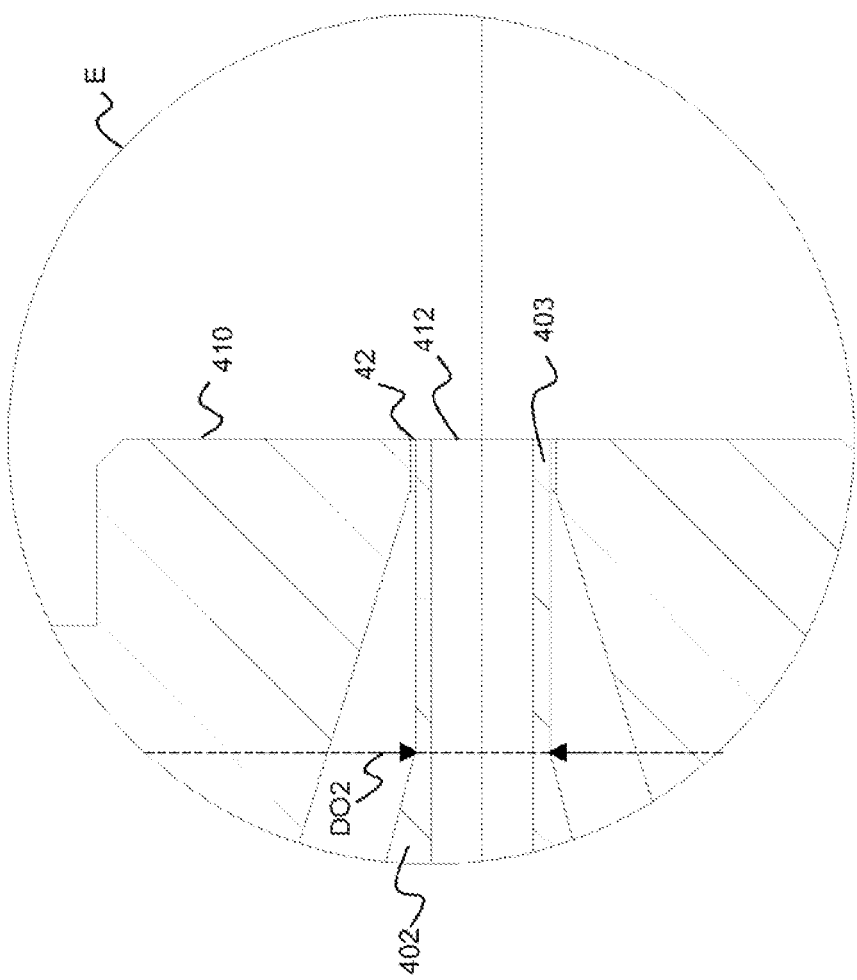
FIG. 5 is an enlarged view of a portion of the extrusion tooling assemblies of FIG. 4 encircled by the circle E.

FIGS. 4 and 5 show the extrusion tooling assemblies 400a in further detail. The extrusion tooling assemblies 400a preferably include a tip element 40 and a die element 41.

The tip element 40 has a lateral wall defining a central cavity 40'. The lateral wall preferably has a first part 401, a second part 403, and a tapered part 402 joining the first part 401 and the second part 403. The first part 401 is preferably substantially in the form of a hollow cylinder having a length L1 equal to 33.3 mm, an internal diameter DI1 equal to 10 mm, and an external diameter preferably increasing substantially linearly from a minimum DO1 min of 13.9 mm to a maximum DO1max of 16.83 mm next to the tapered part 403. The tapered part 402 preferably has a length L2 equal to 31.4 mm. The lateral wall of the tapered part 402 is preferably conformed so that the external surface thereof has a frustoconical shape with aperture α of 30° about, while the internal surface thereof defines a cavity with a frustoconical portion and a cylindrical portion. Next to the first part 401, the tapered part 402 has an internal diameter equal to DI1 (e.g., 10 mm) and an external diameter equal to DO1max (e.g., 16.83 mm). Next to the second part 403, tapered part 402 preferably has an internal diameter DI2 (e.g., of 2 mm) and an external diameter DO2 (e.g., equal to 2.6 mm). The second part 403 preferably has a length L3 equal to 6 mm. The lateral wall of the second part 403 is preferably conformed so that the external surface thereof has a polygonal cross-section shape (e.g., a dodecahedron). The second part 403 preferably has an internal diameter equal to DI2 (e.g., 2 mm) and a maximum external diameter equal to DO2 (e.g., 2.6 mm).

The die element 41 of the extrusion tooling assemblies 400a preferably has a base 410 and a sidewall 411. The base 410 has a hole 412, and the sidewall 411 defines a conical cavity whose vertex corresponds to the aperture 412. The hole 412 preferably has a shape matching with the cross-section of the external surface of the lateral wall of the second part 403 and has a diameter higher than the maximum external diameter DO2 of the second part 403 (e.g., 2.8 mm).

For mounting the extrusion tooling assemblies 400a, the tip element 40 is inserted in the conical cavity of the die element 41, until the free end of the second part 403 engages with the hole 412 (see FIG. 4), thus forming an annular slit 42 (depicted in FIG. 5).

The operation of the apparatus of FIG. 3a will be now described in detail.

First, at the fiber unrolling stage 100, N optical fibers 2 are unrolled from the respective spools. The optical fibers 2 are then passed through the talc injection stage 200 that injects talc between the optical fibers 2. Then, the optical fibers 2 are passed though the S-Z winding stage 300, which preferably winds them according to an open helix (or "S-Z") pattern, thus forming a fiber bundle. Then, the fiber bundle is passed through the extrusion stage 400 that extrudes the retaining element 3 around the fiber bundle.

More particularly, in the extrusion stage 400, the fiber bundle is housed in the central cavity 40' of the male part 40 so that it exits the extrusion tooling assembly 400a through the second part 403 engaging the hole 412. The supply unit 400b preferably supplies film grade material to the extrusion tooling assembly 400a, so that the portion of the conical cavity of the die element 41 external to the tip element 40 is filled with the film grade material. The retaining element 3 is then obtained by extruding the film grade material around the fiber bundle through the annular slit 42.

The extrusion process is performed at a temperature preferably ranging from 150° to 300° C. and at a pressure preferably ranging from 100 to 200 atm. As is known to those skilled in art, the selection of the more suitable process parameters depends on the materials employed in the manufacturing process and on the characteristics of the final product sought. The dimension of the resulting micromodule depends on, for example, extrusion flow, line speed, and tooling (e.g., tip and die) dimensions.

After extrusion, the temperature of the micromodule lowers from the extrusion temperature to room temperature (e.g., about 20° C.).

The micromodule is then stretched by the stretching drum 610 and collected on the collecting drum 620.

The apparatus of FIG. 3b differs from the apparatus of FIG. 3a in that it does not include the talc injection stage 200 but rather includes a jelly injection stage 200' between the S-Z winding stage 300 and the extrusion stage 400. The operation of the apparatus of FIG. 3b is substantially the same as the apparatus of FIG. 3a. Accordingly, a detailed description thereof will not be repeated.

Some tests using the above apparatuses of FIG. 3a and FIG. 3b have been performed.

In a first test, the apparatus of FIG. 3a was used. N was equal to 12, the tip element 40 had DI2 equal to 1.5 mm and DO2 equal to 2.1 mm, while the die element 41 had the hole 412 with diameter of 2.3 mm. The above mentioned BPD3220 linear low density polyethylene was used for extruding the retaining element 3. The internal diameter ID of the retaining element 3 was 1.05 mm, while the external diameter OD was 1.15 mm. The draw down ratio DDR was 4.00, while the draw balance ratio DBR was 1.00, wherein the draw down ratio DDR is defined as:

$$DDR = \frac{\phi_F^2 - \phi_M^2}{\phi_{ext}^2 - \phi_{int}^2} \quad [1]$$

and the draw balance ratio DBR is defined as:

$$DBR = \frac{\phi_F \phi_{int}}{\phi_{ext} \phi_M} = \frac{\phi_F \phi_M}{\phi_{ext} \phi_{int}}, \quad [2]$$

where $\phi_F$ is the die diameter of the hole 412, $\phi_M$ is the external diameter of the tip element 40 (i.e., DO2), $\phi_{ext}$ is the external diameter of the extruded retaining element 3 (i.e., OD), and $\phi_{int}$ is the internal diameter of the extruded retaining element 3 (i.e., ID). The line rate was 50 m/min.

The retaining element 3 of the micromodule 1 obtained with this first test was very easy to remove, due to the space between the retaining element 3 and the optical fibers 2 housed therein. The micromodule 1 was unrolled from the collecting drum 620 and was bent to form a skein. Bending losses were in an acceptable range. Thermal cycles from −30° C. and +60° C. have been performed without giving raise to any performance decrease. Ageing tests at 85° C. for 7 days have been conducted and, also in this case, the outcome of the test was positive.

In a second test, the apparatus of FIG. 3b was used. N was equal to 12, the tip element 40 had DI2 equal to 2.0 mm and DO2 equal to 2.6 mm, while the die element 41 had the hole 412 with diameter of 2.85 mm. The above-mentioned BPD3220 linear low density polyethylene was used for extruding the retaining element 3. A silicone gel suitable for the application in contact with optical fiber was used at the jelly injection stage 2'. The internal diameter ID of the retaining element 3 was 1.05 mm, while the external diameter OD was 1.15 mm. The draw down ratio DDR was 6.19, while the draw balance ratio DBR was 1.00. The line rate was 75 m/min.

The retaining element 3 of the micromodule 1 obtained with this second test was very easily removed, though the force to be applied was higher than in the first test, due to the adhesion force induced by the jelly. The micromodule 1 was unrolled from the collecting drum 620 and was coiled loosely. Bending losses were in an acceptable range. Thermal cycles from −30° C. and +60° C. were performed, without giving raise to any performance decrease. Ageing tests at 85° C. for 7 days were carried out and also in this case the outcome of the test was positive (ease at tearing, acceptable optical fiber attenuation).

Further tests, whose parameters are briefly summarized in Table IV (below), likewise provided positive outcomes.

TABLE IV

| DI2 | DO2 | diameter of hole 412 | DDR | DBR | line rate (m/min) |
|---|---|---|---|---|---|
| 2 | 2.6 | 2.8 | 4.91 | 0.98 | 50 |
| 2 | 2.6 | 2.85 | 6.19 | 1.00 | 80 |

In the tests (above), N was equal to 12, the internal diameter ID of the retaining element 3 was equal to 1.05 mm, and the external diameter OD of the retaining element 3 was equal to 1.15 mm. Jelly was used instead of talc for all the above tests. Also in these tests, the retaining element 3 was very easy to remove and bending losses were in an acceptable range.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical cable for communications (5), comprising:
   at least one micromodule (1), said micromodule (1) comprising a retaining element (3) and a number N of optical fibers (2) housed in said retaining element (3), wherein:
   a diameter of a circumference (C) encircling said number N of optical fibers (2) is 90% to 95% of an inner diameter (ID) of said retaining element (3); and
   said retaining element (3) consists essentially of a film grade polymeric material having an elongation at break equal to or higher than 500%, a melt flow index MFI lower than 3 g/10 min, and a density lower than 1 g/cm³.

2. The optical cable according to claim 1, wherein the retaining element (3) has a thickness ranging from 0.030 mm to 0.125 mm.

3. The optical cable according to claim 2, wherein said retaining element (3) has a thickness ranging from 0.050 mm to 0.110 mm.

4. The optical cable according to claim 1, wherein said retaining element (3) is made of a polymeric material having an elongation at break equal to or higher than 600%.

5. The optical cable according to claim 1, wherein said retaining element (3) is made of a polymeric material having an elongation at break equal to or higher than 800%.

6. The optical cable according to claim 1, wherein said film grade polymeric material is uncharged.

7. The optical cable according to claim 1, wherein said number N of optical fibers is equal to 12, and the outer diameter of said retaining element (3) ranges from 1.15 mm to 1.3 mm.

8. The optical cable according to claim 1, wherein said number N of optical fibers is equal to 4, and the outer diameter of said retaining element (3) ranges from 0.75 mm to 0.89 mm.

9. A micromodule (1) for an optical cable for communications (5), comprising:
   a retaining element (3) and a number N of optical fibers (2) housed in said retaining element (3), wherein:
   a diameter of a circumference (C) encircling said number N of optical fibers (2) is 90% to 95% of an inner diameter (ID) of said retaining element (3); and
   said retaining element (3) consists essentially of a film grade material having an elongation at break equal to or higher than 500%, a melt flow index MFI lower than 3 g/10 min, and a density lower than 1 g/cm³.

10. The micromodule (1) according to claim 9, wherein said retaining element (3) has a thickness ranging from 0.030 mm to 0.125 mm.

11. The micromodule (1) according to claim 10, wherein said retaining element (3) has a thickness ranging from 0.050 mm to 0.110 mm.

12. The micromodule (1) according to claim 9, wherein said retaining element (3) is made of a polymeric material having an elongation at break equal to or higher than 600%.

13. The micromodule (1) according to claim 9, wherein said retaining element (3) is made of a polymeric material having an elongation at break equal to or higher than 800%.

14. The micromodule (1) according to claim 9, wherein said film grade polymeric material is uncharged.

15. The micromodule (1) according to claim 9, wherein said number N of optical fibers is equal to 12, and the outer diameter of said retaining element (3) ranges from 1.15 mm and 1.3 mm.

16. The micromodule (1) according to claim 9, wherein said number N of optical fibers is equal to 4, and an outer diameter of said retaining element (3) ranges from 0.75 mm to 0.89 mm.

17. A process for manufacturing a micromodule (1) for an optical cable for communications (5), said process comprising:

providing a number N of optical fibers (2); and providing a retaining element (3) around said number N of optical fibers (2) thus forming said micromodule (1), wherein providing a retaining element (3) comprises extruding a film grade material, said film grade material having an elongation at break equal to or higher than 500%, a melt flow index MFI lower than 3 g/10 min, and a density lower than 1 $g/cm^3$, wherein the diameter of a circumference (C) encircling said number N of optical fibers (2) is 90% to 95% of an inner diameter (ID) of said retaining element (3).

18. The process according to claim 17, wherein said step of extruding is performed by means of extrusion assemblies (400*a*) comprising a tip element (40) and a die element (41).

19. The process according to claim 18, wherein said tip element (40) and said die element (41) have a draw down ratio DDR ranging from 4.5 to 8.5.

20. The process according to claim 18, wherein said step of extruding is performed as tubing extrusion.

21. The process according to claim 17, wherein said step of extruding is performed at a line rate ranging from 40 m/min to 150 m/min.

22. The process according to claim 17, wherein said film grade material has an elongation at break equal to or higher than 600%.

* * * * *

UNITED STATES PATENT AND TRADEMARK OFFICE
CERTIFICATE OF CORRECTION

PATENT NO. : 9,213,158 B2
APPLICATION NO. : 13/431164
DATED : December 15, 2015
INVENTOR(S) : Enrico Consonni et al.

It is certified that error appears in the above-identified patent and that said Letters Patent is hereby corrected as shown below:

In the Specification

Column 11, Lines 7-12 the draw balance ratio DBR is defined as:

$$DBR = \frac{\phi_F \phi_{int}}{\phi_{ext} \phi_M} = \frac{\phi_F \phi_M}{\phi_{ext} \phi_{int}},$$

and should be defined as:

$$DBR = \frac{\phi_F \phi_{int}}{\phi_{ext} \phi_M} = \frac{\phi_F / \phi_M}{\phi_{ext} / \phi_{int}}$$

Signed and Sealed this
Twenty-eighth Day of June, 2016

Michelle K. Lee
*Director of the United States Patent and Trademark Office*